No. 621,306. Patented Mar. 14, 1899.
C. L. KNEELAND & W. C. HARTMANN.
CENTRIFUGAL CREAM SEPARATOR.
(Application filed Apr. 13, 1898.)
(No Model.)
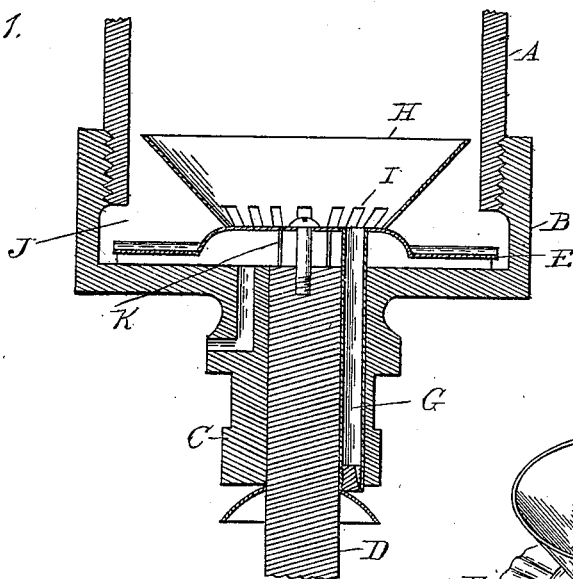
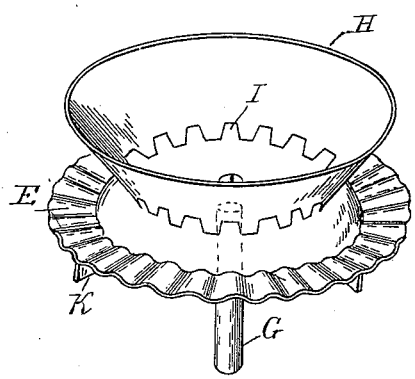
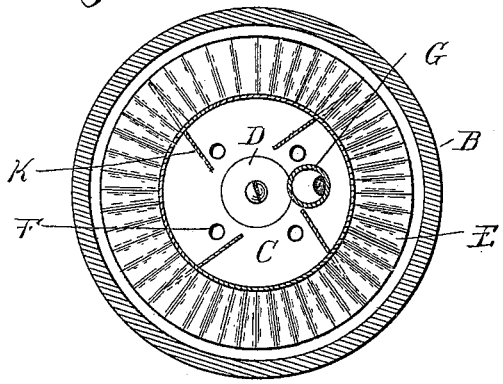
Inventors
Charles L. Kneeland
William C. Hartmann

UNITED STATES PATENT OFFICE.

CHARLES L. KNEELAND AND WILLIAM C. HARTMANN, OF LANSING, MICHIGAN; SAID HARTMANN ASSIGNOR TO SAID KNEELAND; SAID KNEELAND ASSIGNOR OF ONE-HALF TO GUY W. RENYX, OF SAME PLACE.

CENTRIFUGAL CREAM-SEPARATOR.

SPECIFICATION forming part of Letters Patent No. 621,306, dated March 14, 1899.

Application filed April 13, 1898. Serial No. 677,406. (No model.)

*To all whom it may concern:*

Be it known that we, CHARLES L. KNEELAND and WILLIAM C. HARTMANN, citizens of the United States, residing at Lansing, in the county of Ingham and State of Michigan, have invented certain new and useful Improvements in Centrifugal Separators, of which the following is a specification, reference being had therein to the accompanying drawings.

The invention relates more particularly to that class of separators especially designed for separating full milk into blue milk and cream; and the invention consists in the peculiar construction of a final separating or skimming device arranged in proximity to the outlet-passages from the bowl and adapted to more thoroughly eliminate from each of the products any trace of the other which may remain after the separation effected in the body of the bowl.

In the drawings, Figure 1 is a longitudinal section through the lower portion of a separating-bowl, showing our improvement applied thereto. Fig. 2 is a cross-section on line $x$ $x$, Fig. 1. Fig. 3 is a perspective view of the skimmer detached.

A is the separating-bowl, of which the lower portion only is shown in the drawings, the invention relating solely to the construction of that portion. At or near the bottom of the bowl is formed in the side walls thereof an annular groove or channel, preferably by providing the bowl with a detachable bottom having the upwardly-extending annular flange screwed or otherwise secured to the body portion of the bowl and forming an enlarged chamber beneath said body portion. The bottom B is provided with a downwardly-projecting hub C, which is mounted upon a spindle D.

E is a disk or false bottom arranged slightly above the bottom of the bowl and extending completely across beneath the chamber formed in the body of the bowl, but leaving a peripheral passage-way connecting the spaces above and below said false bottom formed by the annular groove in the side walls.

F is a milk-outlet passage or passages communicating with the space beneath the diaphragm, and G is a cream-outlet tube communicating with the space above the diaphragm and passing out through an aperture in the hub C. The effect of this construction is to force the separated blue milk into the outlet-passage F from the extreme outer circle of the bowl, where it is least liable to be mixed with any cream, and as the milk is drawn uniformly from all sides of the bowl there is no tendency to form a circulatory current.

To further increase the skimming effect, we preferably arrange a second diaphragm H, in the shape of an inverted cone, above the diaphragm E, its upper edge extending within a short space from the wall of the bowl and its lower edge to near the circle of the cream-outlet. The lower inner portion of this diaphragm is provided with a series of apertures I. This diaphragm will act in a similar manner, causing the milk to pass to the extreme margin of this bowl before it can enter the space beneath; but it has the further function of forming an annular pool or still-well J beneath the diaphragm, in which any trace of cream that may remain will again be subjected to the centrifugal action and forced inward, passing through the apertures I to the cream-outlet. At the same time any blue milk which may remain with the cream on the upper side of the diaphragm will be given another opportunity to escape through the apertures I into the pool J. The diaphragm E will then operate in the manner before described to effect the final separation.

For the milk-outlet we preferably form a number of passages F, arranged around equidistant from the centers, and to direct the milk to these passages we arrange wings K below the diaphragm E, extending inward and inclined slightly backward in relation to the direction of rotation of the bowl. These diaphragms will direct the milk inward separately to each of the outlets and also assists in forcing the flow.

What we claim as our invention is—

1. In a centrifugal separator, a rotatable bowl, provided with a false bottom extending completely across beneath the chamber in the body of the bowl, said bowl having formed in its side walls, an annular channel surrounding said false bottom and forming a peripheral passage connecting the spaces above and below the same, and the bottom of said bowl having formed therein an outlet-passage connecting with the space beneath said false bottom, and a tube forming a second passage passing through said false bottom and communicating with the space thereabove.

2. In a centrifugal separator the combination of the bowl, a diaphragm arranged to form a false bottom in said bowl with an annular marginal passage communicating with one outlet and said bowl having a second separate outlet-passage through said diaphragm, a second inverted conical diaphragm having passages formed therethrough around its lower end and a narrow annular marginal passage around its upper end for the purpose described.

3. The combination with the bowl having a number of outlet-passages F in the bottom thereof, of the diaphragm E arranged within the bowl slightly above the bottom thereof forming a narrow marginal passage connecting the spaces above and below the same, the wings K dividing the space beneath said diaphragm and adapted to direct the liquid toward the outlets F, the tube G passing through the diaphragm and through the bottom of the bowl and the inverted conical diaphragm H having the apertures L at its lower end and forming a narrow marginal passage at its upper end for the purpose described.

In testimony whereof we affix our signatures in presence of two witnesses.

CHARLES L. KNEELAND.
WILLIAM C. HARTMANN.

Witnesses:
LIDA HAVENS,
GUY W. RENYX.